Sept. 5, 1967     S. R. KRAUSE     3,340,509
INVENTORY INTERROGATING CONTROL AND READ-OUT SYSTEM AND APPARATUS
Original Filed April 9, 1962     9 Sheets-Sheet 5

FIG. 5.

INVENTOR
S. R. Krause

United States Patent Office 3,340,509
Patented Sept. 5, 1967

3,340,509
INVENTORY INTERROGATING CONTROL AND READ-OUT SYSTEM AND APPARATUS
Stephen R. Krause, Baltimore, Md., assignor, by mesne assignments, to K & M Electronics Company, a corporation of Maryland
Continuation of application Ser. No. 186,227, Apr. 9, 1962. This application Nov. 4, 1965, Ser. No. 516,815
10 Claims. (Cl. 340—149)

The present invention relates to an inventory interrogating control and read-out method, system and apparatus for enabling an installation containing such equipment to count, for example, items of clothing, merchandise or various forms of other materials which are either kept on racks, shelves or on tables in remote locations in such places as manufacturing establishments, retail stores or wholesale houses and is a continuation of my application, Ser. No. 186,227, filed Apr. 9, 1962 and entitled, "Inventory Interrogating Control and Read-out Method, System and Apparatus."

The equipment and method of the present invention will allow an individual to take a count of a particular item, for example, by dialing on a dial the number and designation or size of the item into the equipment whereby the equipment will interrogate the entire system, or segments of the system, and relay back to a read-out such information as the correct quantity currently in stock at that moment of a particular size, style, manufacturer, or price range of the item being interrogated for, be it suit, dress, uniform, or other wearing apparel.

A further object of the present invention is to provide a method, system and equipment in accordance with the present invention which remotely counts the physically present inventory units or items.

With the foregoing and other objects in view, the invention will be more fully described hereinafter, and will be more particularly pointed out in the claims appended hereto.

In the drawings, wherein like symbols refer to like or corresponding parts throughout the several views.

FGURE 2 is an electrical schematic view of one form of electrical circuitry which may be employed as a component of the interrogating and pulsing means of the equipment of the present invention.

Referring more particularly to the drawings, the arrows on relay contacts and coils refer to positions of contacts upon energization.

Figure 1:
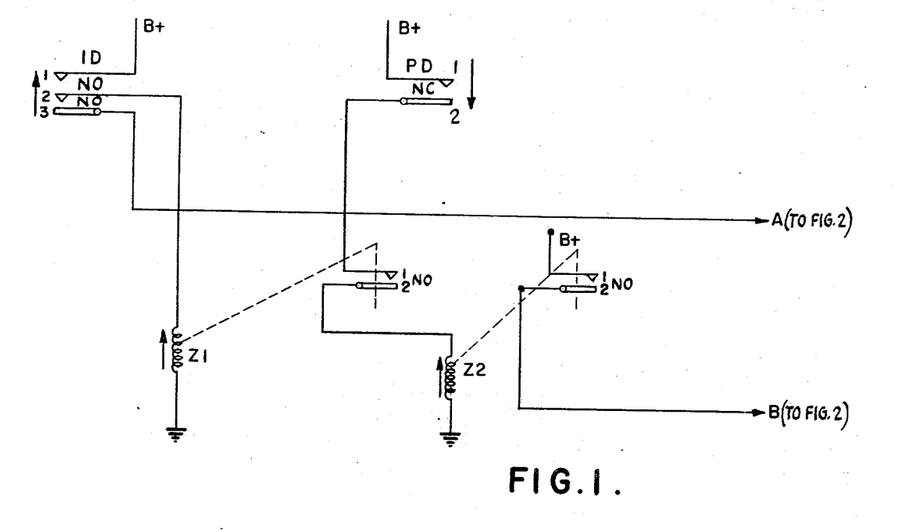
FIGURE 1 is an electrical schematic view of one form of dialing device which may be employed as a pulsing means in accordance with the present invention.
Figure 2:
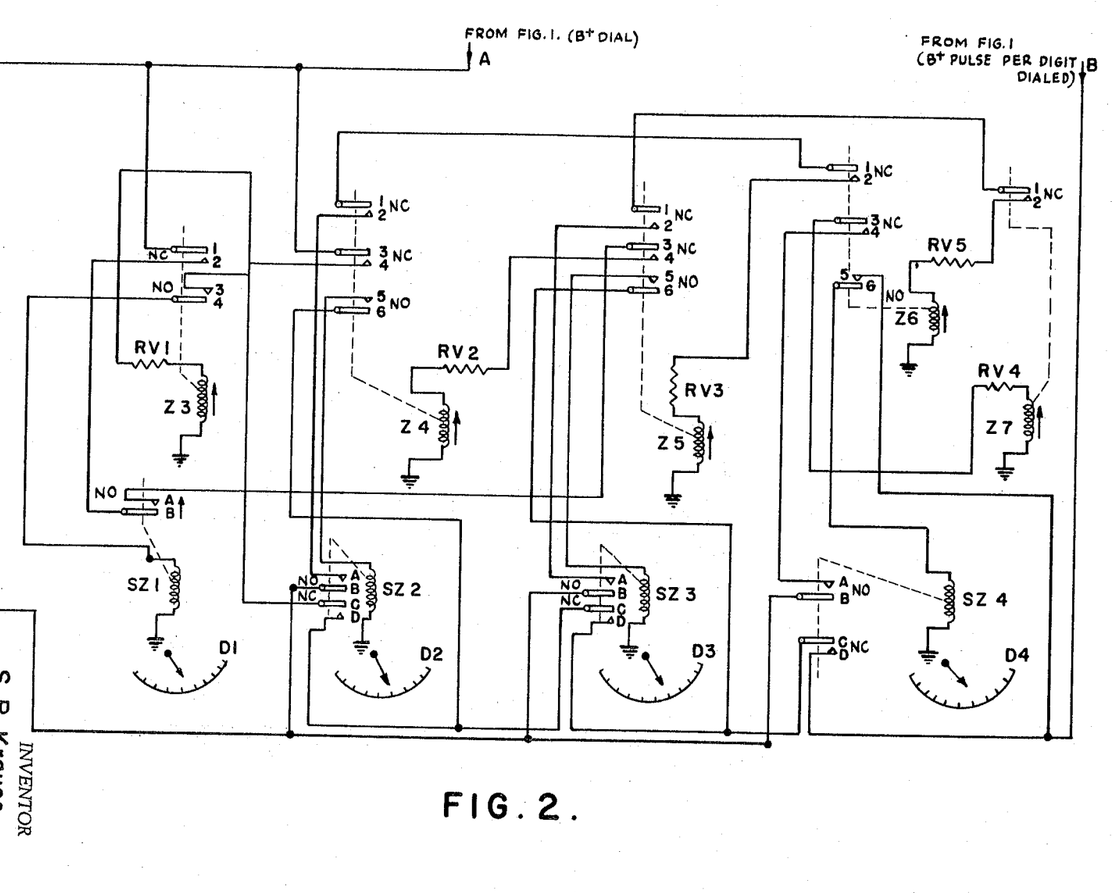

FIGURES 1 and 2 show the dialing sequential circuit. ID and PD in FIGURE 1 are parts of the ten number digital dial such as the type used on a telephone. When the dial is placed into operation (dialed), contacts 1, 2 and 3 of contact assembly ID come together and complete two circuits allowing power to flow from B+ through contact 1 into contact 2 and energize relay Z1. Contact assembly PD with contacts 1 and 2 are normally in a make position. As the dial is turned, each digit interrupts contacts 1 and 2 (of PD) allowing them to break momentarily. As Z1 becomes energized, its contact assembly makes contact with 1 and 2 of that assembly (dotted line), allowing current to flow from B+ through PD contacts 1 and 2 through Z1 contacts 1 and 2 and thereby energize relay Z2. Z2's contacts make each time PD's contacts make, thereby sending power from B+ through contacts 1 and 2 to wire B.

Figure 3:
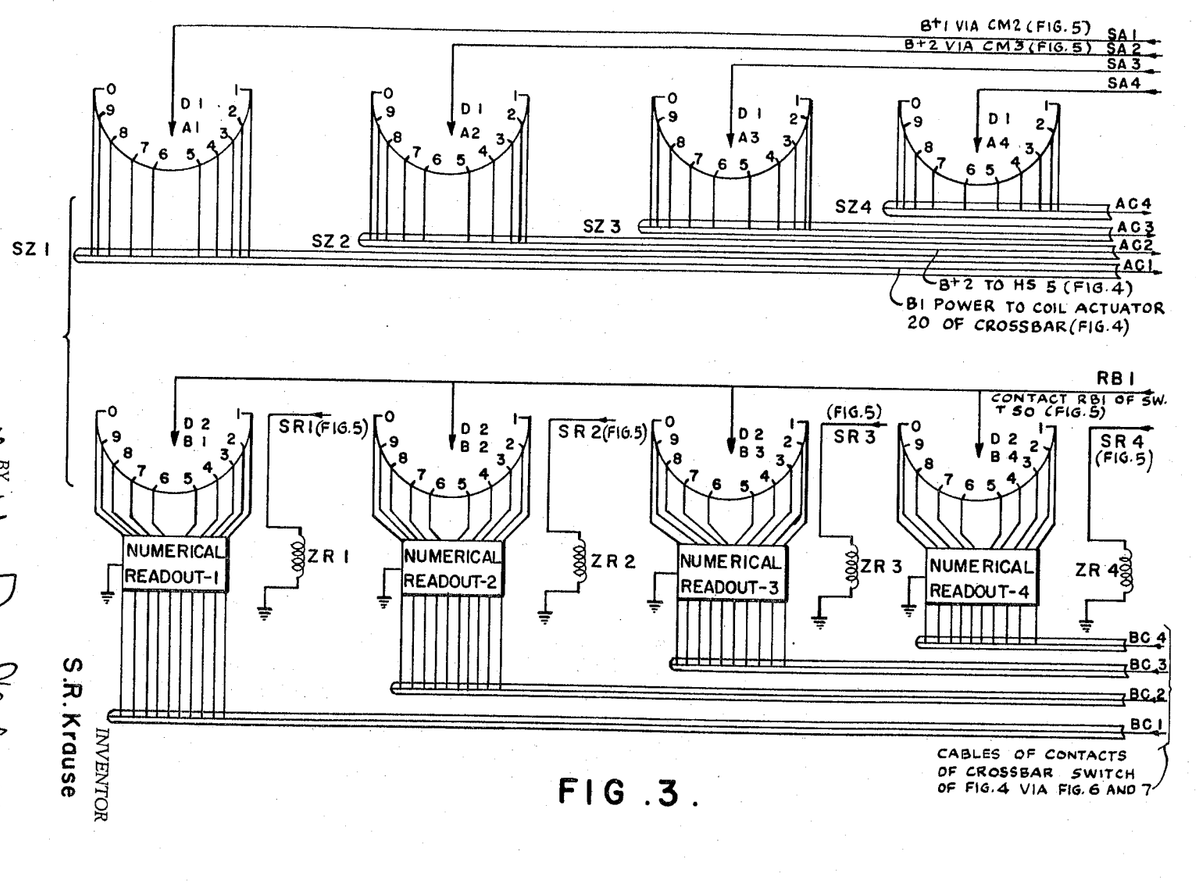
FIGURE 3 is an electrical schematic of one form of read-out and check system employed as an element of the interpreting means of the present invention.

In FIGURE 2 is shown the sequential action whereby each stepping switch designated at SZ1, SZ2, SZ3 and SZ4 is allowed one chance to connect with the dial assembly. As the dial is first turned, contacts on assembly ID close allowing power to flow through wire A, through contacts 3 and 4 of relay Z4 and energizing relay Z3. As relay Z3 becomes energized, contacts 1 and 2 on Z3 break, and contacts 3 and 4 make, allowing current from wire B (pulse from dial) to flow through closed contacts C and D on SZ4, through C and D on SZ3, and through contacts C and D on SZ2, through said contacts 3 and 4 on Z3 to energize stepping switch SZ1 which sets its level D1 on the digit dialed (FIGURES 2 and 3). As stepping switch SZ1 becomes energized, contacts A and B on SZ1 make. As the dial rotates back to normal position, contacts ID 1, 2 and 3 break and contacts PD 1 and 2 make. This interrupts current through wire A which releases relay Z3 and thereby breaks contacts 3 and 4 and makes contacts 1 and 2 on Z3.

As the dial is rotated a second time, power runs through wire A, through contacts 1 and 2 of Z3, through contacts A and B of SZ1, through contacts 3 and 4 of Z5 and energizes relay Z4. This action breaks contacts 1 and 2, and 3 and 4 on Z4 and makes contacts 5 and 6 on said relay Z4.

This action permits pulsed power from dial to flow from wire B through closed contacts C and D of SZ4, through C and D of SZ3, through contacts 5 and 6 of said relay Z4 and energize stepping switch SZ2 and sets its level D2 on the second digit dialed. As stepping switch SZ2 becomes energized, contacts A and B make while contacts C and D break. As the dial returns to its normal rest position, power ceases to flow through wire A and relay Z4 de-energizes, breaking contacts 5 and 6 and making contacts 1 and 2, and 3 and 4 on relay Z4.

As the dial is rotated a third time, power flows through wire A, through contacts A and B of SZ2, through contacts 1 and 2 of Z4, through contacts 1 and 2 of Z6 and energizes coil of relay Z5. As Z5 is energized, contacts 1 and 2 and 3 and 4 of Z5 break and contacts 5 and 6 of said relay Z5 make. Power then flows (pulsed) from wire B, through closed contacts C and D of SZ4 through contacts 5 and 6 of Z5 and energizes stepping switch SZ3 to the third digit dialed on its level D3. As stepping switch SZ3 becomes energized, contacts C and D break and contacts A and B of SZ3 make. As the dial returns to its normal rest position, power ceases to flow through wire A and relay Z5 becomes de-energized and therefore contacts 1 and 2 and 3 and 4 of Z5 make and contacts 5 and 6 break.

As the dial is rotated a fourth time, power flows through wire A, through contacts A and B of SZ3, through contacts 1 and 2 of Z5, through contacts 1 and 2 of Z7 and energizes relay Z6. As relay Z6 is energized, contacts 1 and 2 and 3 and 4 break and contacts 5 and 6 of Z6 make. Pulsed current then runs through wire B, through contacts 5 and 6 of Z6 and energizes stepping switch SZ4 to the fourth digit dialed on its level D4. As stepping switch SZ4 is energized, contacts C and D break and contacts A and B make. As the dial is returned to its normal rest position, power ceases to flow through wire A and relay Z6 becomes de-energized, thereby causing contacts 1 and 2 and contacts 3 and 4 to make and contacts 5 and 6 to break.

Should the dial be rotated again by mistake or in error, wire A would become energized and send current through contacts A and B of SZ4, through contacts 3 and 4 of Z6 and energize relay Z7 which would break contacts 1 and 2 of Z7 and thereby prevent any additional pulsed signals from the dial to enter any of the stepping switches which have already been energized.

This sequential circuit is shown for use with four stepping switches but can be used for any number of stepping switches by simply adding additional duplicate circuitry and components. This sequential arrangement allows one and only one series of pulses to be received by any one stepping switch. A pulse or series of pulses must be received by each stepping switch before its associated circuitry will permit the next stepping switch in line to be connected to the dial. This arrangement allows for a minimum of errors and mistakes by untrained personnel in operation of the device.

FIGURE 3 shows stepping switches SZ1, SZ2, SZ3 and SZ4 with associated wiring on two decks or levels of each stepping switch. The wiring designated as AC1, AC2, AC3 and AC4 are cables composed of wires 1 through 10 on contacts 1 through 10 on each stepping switch. These wires activate coils which in turn activate bars and contacts of a conventional crossbar switch shown in FIGURE 4. The lower deck or level of each stepping switch is designated as D2 and its wires are fed directly into a 1–0 digital (numerical) read-out device. Cables BC1, BC2, BC3 and BC4 are connected to contacts on each coil of crossbar switches as will be explained in later drawings. Wire RB1 is connected to contact RB1 on switch TS0 in FIGURE 5 (lower left corner).

Figure 4:
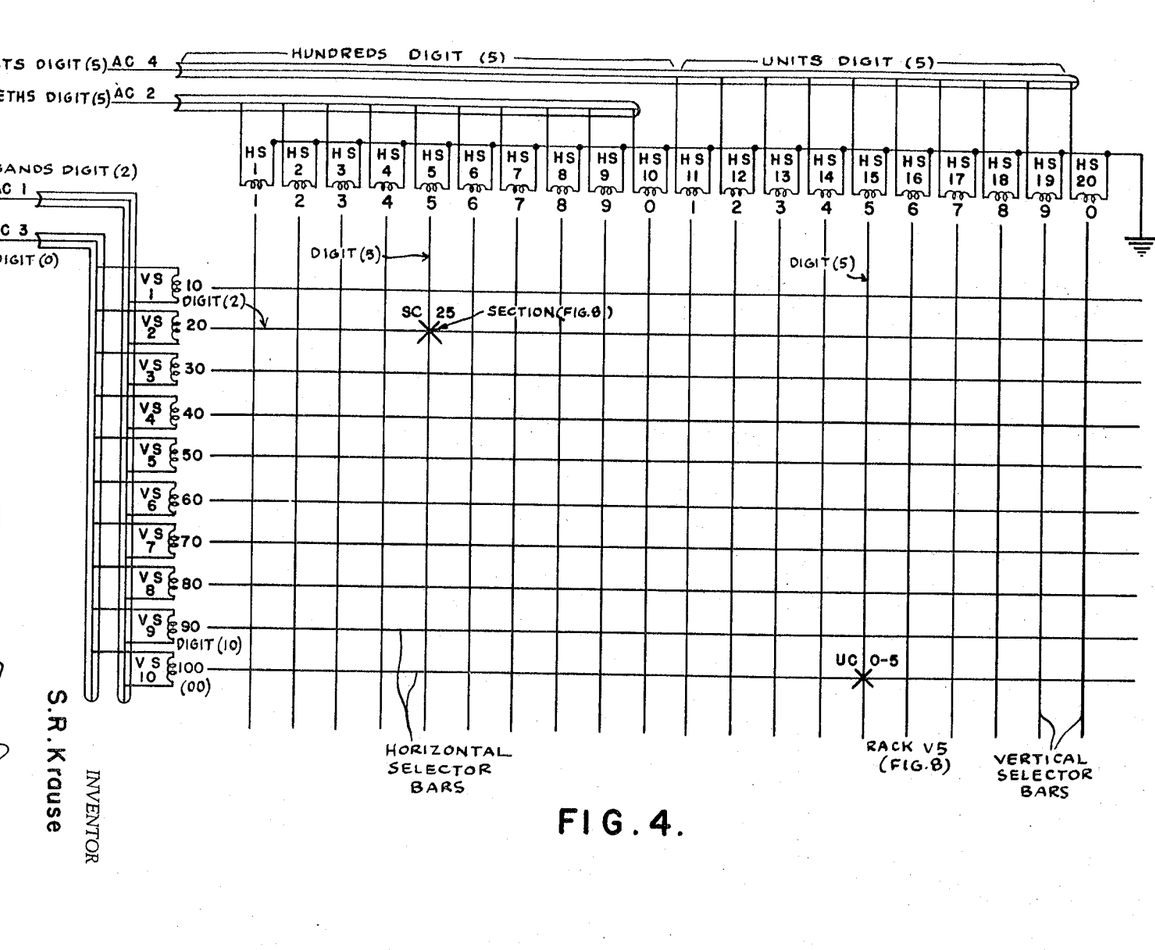
FIGURE 4 is an electrical schematic of one form of cross bar unit employed as an element of the interrogating means.

FIGURE 4 shows a diagram of 10×20 crossbar switch (available from James Cunningham, Sons and Inc., Inc., Rochester, N.Y.). This switch is composed of ten horizontal rods connected to a coil actuating assembly and twenty vertical rods which are also connected to a coil actuating assembly. Where each horizontal and vertical bars meet there is a set of contacts. Where these contacts are located are called crosspoints. To actuate a set of contacts at one particular crosspoint, it is necessary to activate one vertical bar and one horizontal bar, the contacts then making.

Figure 5:
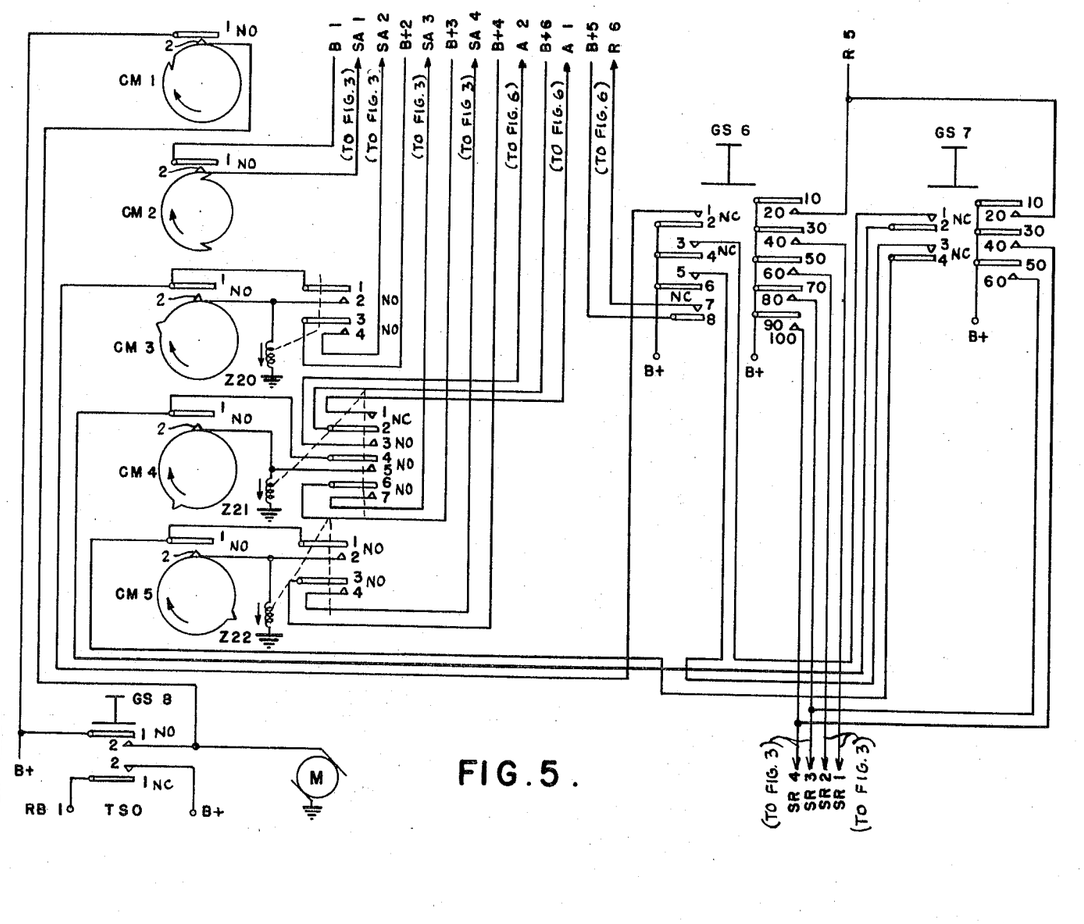
FIGURE 5 is an electrical schematic of one form of interlock system for interlocking the pulsing means with the interrogating means of the present invention.

FIGURE 5 contains a cam action switch with five levels. The first level CM1 controls one revolution of the motor for the cam action. The other four levels control current to the cross-bar switch.

Mode of selection

In order to demonstrate how a selection is made and information received through the machine, the set-up of the machine and its surroundings must be explained.

Figure 7:
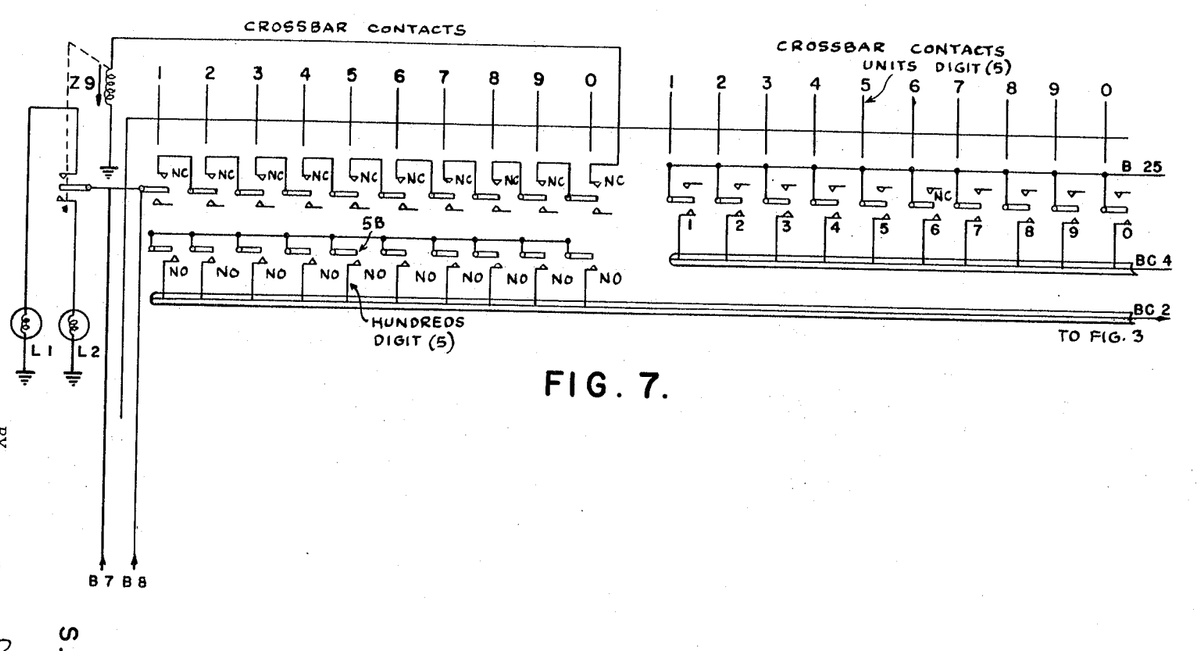
FIGURE 7 is an electrical schematic of a detection system to ascertain which section of a plurality of sections in the interrogating means in energized at any particular given time.

The machine is located in a retail establishment and is connected to various racks of dresses and suits. This particular store is divided into 100 sections with each section containing 10 racks. (The circuitry and present components shown in the drawings can accommodate 100 sections each containing 600 racks and with a few additional components the capacity can be drawn out to an unlimited number of sections and racks.) In order to find out how many size 5 dresses are located in section 25, it is first necessary to dial the number 25 into the dial, followed by 05; these four digits are stored in the stepping switches SZ1, SZ2, SZ3 and SZ4. As each digit is dialed into the stepping switch, current flows through wire B+ and contacts 1 and 2 of switch TS0 in FIGURE 5 through wire RB1 into arms BC1, BC2, BC3 and BC4 of stepping switches level D2 in FIGURE 3 and gives a numerical read-out on read-out devices 1, 2, 3 and 4. These numbers are stored in this section until it has been ascertained that the cross bar section of the machine is free for use (there may be several dialing and interrogating devices connected into one cross bar section) by seeing that individual operators "on" light L1 in FIGURE 7 is lit; should light L2 be lit, this would designate that the cross bar is at present in use by another station. Relay Z9 is energized through 10 normally closed cross-bar contacts shown to the upper left in FIG. 7 and thus its contacts are maintained normally closed in the upper position, thereby maintaining light L1 on. If any one of the ten cross-bar contacts is open, Z9 is de-energized and its contacts closed to energize light L2 indicating to an intended operator that the machine is already in use.

Figure 8:
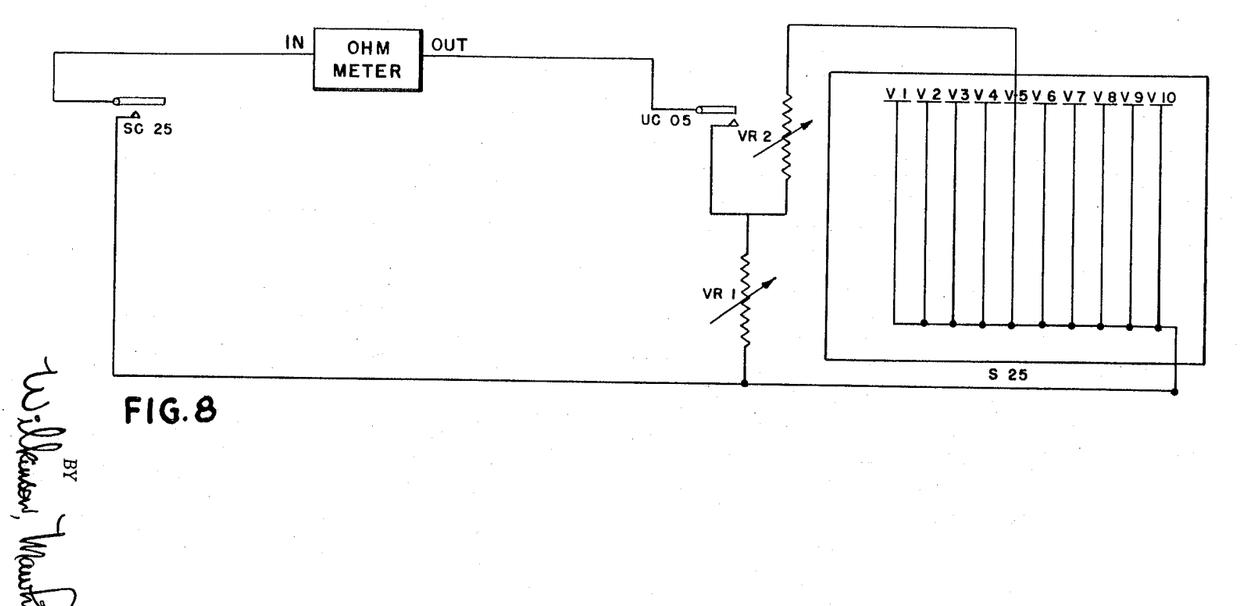
FIGURE 8 is an electrical schematic of a unitized section constructed in accordance with the present invention showing a meter detection device in circuit with the racks of the section.

When the cross bar section is free for use, lever GS8 in FIGURE 5 is pushed which makes upper contacts 1 and 2 and opens lower contacts 1 and 2 and thereby extinguishes the read-out lights in FIGURE 3. Upper contacts on GS8 (1 and 2) make, causing motor M to make contact and turn cams CM1, CM2, CM3, CM4 and CM5. Contacts 1 and 2 on cam CM1 make immediate contact and hold for one revolution of the cam action. These contacts supply power through wire B+ (left lower side FIGURE 5) to the motor after switch GS8 is released. It should be noted that switch TS0 located below switch GS8 holds automatically until released. Contacts 1 and 2 on cam CM2 make first supplying power through wire B+ to wire SA1 and wiper arm A1 on level D1 of stepping switch SZ1 supplying power through point 2 through cable AC1 in FIGURE 3 to coil actuator (VS2) 20 on (corresponding to thousands digit 2 in the address 2505) crossbar switch in FIGURE 4, thus engaging bar 20 on the switch. With power still flowing through cam CM2, cam CM3 closes its contacts 1 and 2 thereby causing power to flow from wire B+ on switch GS6 through contacts 1 and 2 on GS6, through contacts 1 and 2 on CM3 and energizing relay Z20, Z20 staying energized even though contacts CM3, 1 and 2 are again open because power now flows through contacts 1 and 2 of Z20 supplying another path for the current to energize Z20. Contacts 3 and 4 of Z20 make and allow power to flow from wire B+2 to wire SA2 and into wiper arm A2 on deck D1 of stepping switch SZ2. Power now flows through point 5 (hundreds digit of 2505) and into cable AC2 and on to coil actuator 5 (FIGURE 4) of crossbar switch. When this takes place crosspoint SC25 closes and makes contacts SC25 in FIGURE 8 which supplies input power to section 25.

Cam contacts 1 and 2 of CM3 (FIGURE 5) now break, releasing coil and bar 20 on crossbar switch, but crosspoint SC25 is still held by energized coil HS5. Cam CM4 now makes contacts 1 and 2 and thereby supplies power through wire B+ to switch GS6 and flows through contacts 3 and 4 and through contacts 1 and 2 of switch GS7 and energizes relay Z21 thereby causing contacts 1 and 2 to break and contacts 2 and 3 to make contacts 4 and 5 to make and contacts 6 and 7 to make. Power flowing through contacts 4 and 5 cause power to flow through the coil of Z21 after cam contacts 1 and 2 break. Power now flows from wire B+3 to SA3 into wiper arm A3 and places power through point 0 (tens digit of 2505) of stepping switch SZ3 and into cable AC3. Power now actuates coil VS10 (00) of crossbar switch and engages bar 00. Cam CM5 now closes contacts 1 and 2 placing power from wire B+ of switch GS6 through contacts 5 and 6 and to contacts 3 and 4 of switch GS7 to relay Z22 making contacts 1 and 2 and 3 and 4. Power now flows through 1 and 2 keeping relay Z22 energized. Power flows from wire B+4 through contacts 3 and 4 to wire SA4 to wiper arm D1 of stepping switch SZ4. In turn power is supplied through point 5 of stepping switch SZ4 into cable AC4 and actuates coil HS15 and moves bar 5 which causes crosspoint UC05 to close and supply output to rack V5 in FIGURE 8. It should be appreciated that in FIG. 8 the rack contacts such as UC05 are in series with their section contact such as SC25. Thus, if ten racks are associated with the given section, there will be ten contacts designated UC01 to UC10. The section contacts are in parallel permitting the same ohm meter to be used by all sections and racks.

As each of the preceding crossbar actions takes place the read-out lights in FIGURE 3 are caused to relight and display where the crossbar switches are aligned. This operation is necessary to assure that the unit is not operating incorrectly and if it is, the operator will be able to tell this since the numbers originally dialed into the machine are not displayed as they should be.

Figure 6:
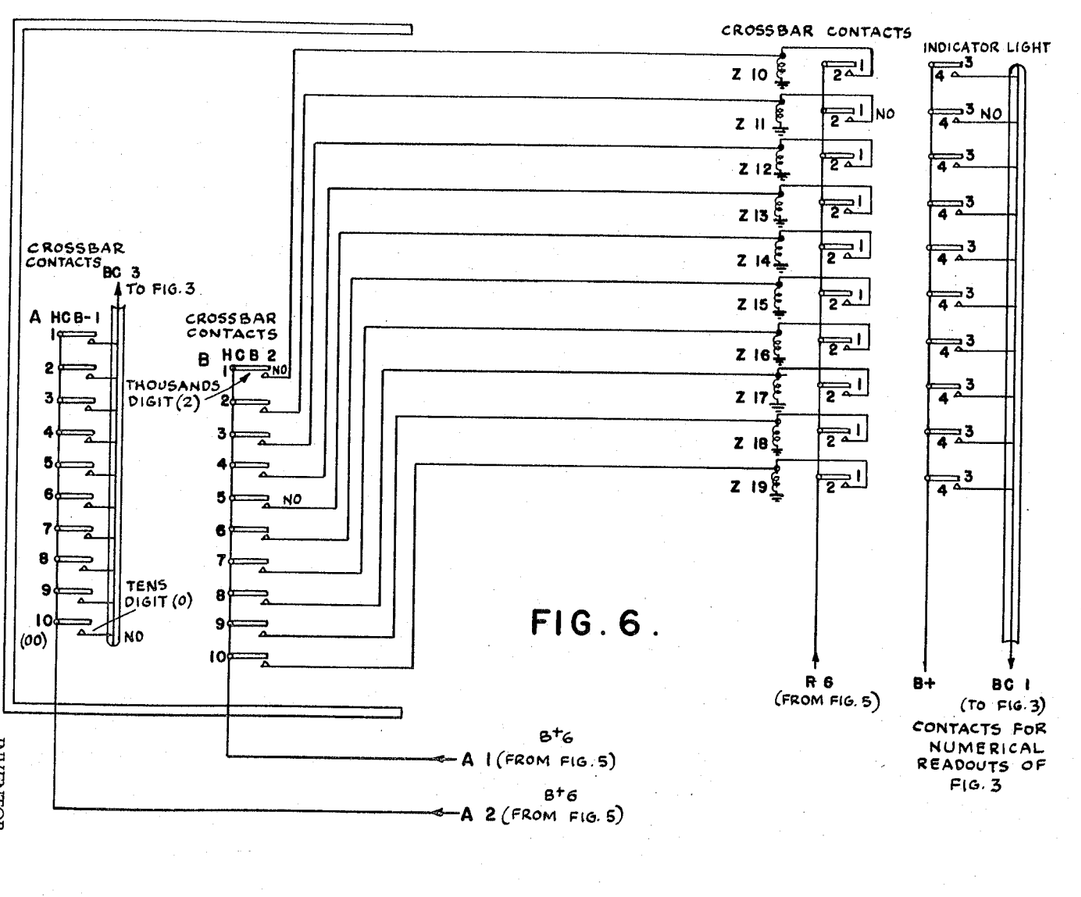
FIGURE 6 is an electrical schematic of a form of detecting circuitry employed to ascertain correct operation of the interrogating means of the present invention.

This action takes place as follows: As the first digit is placed into the crossbar, the coil that actuates said bar also actuates a set of contacts. This is shown in FIGURES 6 and 7. In this case the first digit 2 actuates coil VS2 and contacts A2 and B2 (of HCB1 and HCB2) in FIGURE 6. Contact assembly HCB2 is supplied power from wire A1 connected to relay 21 and contacts 1 and 2 in FIGURE 5 to B+6. This power flows through contact B2 and into relay Z11 closing contacts 1 and 2 and 3 and 4. Contacts 3 and 4 supply power through wire B+ into cable BC1 and into read-out device 1 which now displays the digit 2. Digit 5 which is the next number entered into the crossbar activates contacts 5B (FIGURE 7) and causes power to flow through wire B+8 (FIGURE 7) through contacts 5B into cable BC2 and thence into read-out device 2 which displays the digit 5.

As the third digit is to be entered into the machine cam CM4 causes relay Z21 to break contacts 1 and 2 and make 2 and 3. This cuts power off of contact assembly HCB2 and places power through A2 into contact assembly HCB1. Power now flows through digit 0 on HCB1 into cable BC3 and thereon into read-out device 3 which displays digit 0. The last digit is entered into the machine and causes power to flow through wire B25 in FIGURE 7 into contacts 5 and into cable BC4 which supplies power to read-out device 4 which now displays the digit 5.

It must be noted that the action of entering the number into the crossbar, the actuation of the bar and the display of the read-out devices all take place at one time for each digit.

Push button switches GS6 and GS7 are included in FIG. 5 for reset purposes. Switch GS7 resets only the hundreds and units digits such as 05 in the address 2505. Frequently the section 25 remains the same, but various racks as 01, 05, 08, etc. are likely to be interrogated in sequence. Thus, the operator need only reset GS7 and dial the last two digits. On the other hand, reset switch GS6 resets all four digits to clear the machine for interrogating a new section and rack. From the circuitry as explained, the release or reset buttons release the select and hold relays of the cross-bar switch.

In FIGURES 9a–9d the racks and the indicating means whereby it can be determined if an item is hanging on a rack or if that rack is empty. The units on the rack are designated by the use of a resistance value (R1 to R5 FIGURE 9a). When an item is hung on the rack, button UN4 is pushed down and a resistance R4 is connected in series with the line T1, T2. Each section of the rack (each rack is designed to hold 100 units) is equipped with a button affair as shown by HL1 in FIGURE 9d. The top section being a button, the middle section a resistance value and the bottom section a free path for current. As the rack is filled, pressure is applied by the hanger and weight of the unit on the hanger to the button which depresses the button throwing a resistance in series with the line. If each button is equipped with a 10 ohm resistance, should fifty items be on the rack the ohm meter read-out would register 500 ohms (see FIGURE 8). This value would be run through an analog-to-digital converter and the digit number 50 could be displayed on a read-out device. In reality an ohm meter is one form of analogue to digital converter and as such in the present invention will provide suitable visual read-out. However, is is obvious that any conventional analogue to digital converter with or without print-out arrangement could be included in this circuit to convert resistance value to a printed numerical value.

Figure 9A:
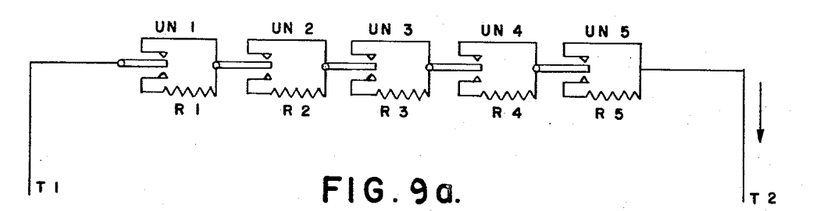
FIGURE 9a is an electrical schematic of the electrical detection system employed by each hanger in a rack group.

Compensating resistors VR1 and VR2 have been included in the circuit for the usual reasons of compensating for the line resistance where it is common to employ, for example, 50-foot and 500-foot lines in any given installation.

Figure 9B:
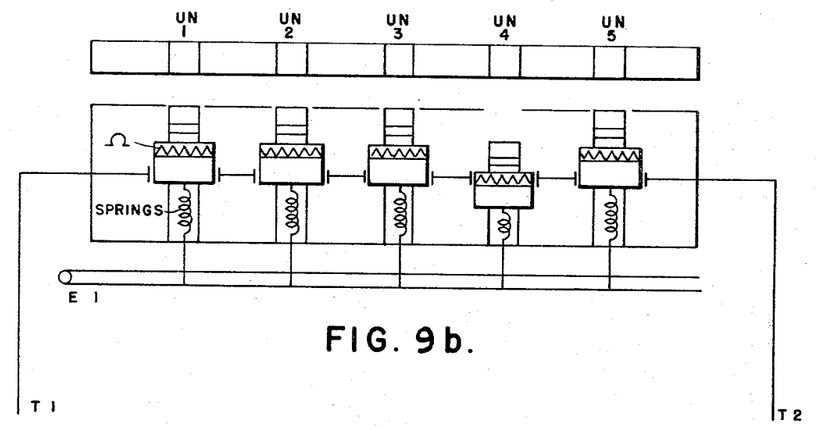
FIGURES 9b, 9c and 9d are electro-mechanical schematics of a rack for supporting items in accordance with the present invention.
Figure 9C:
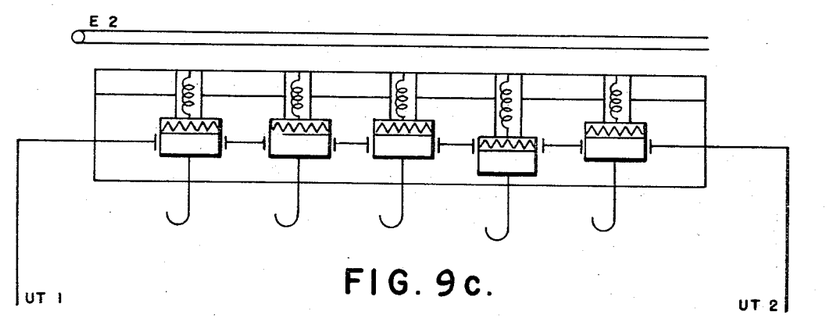
Figure 9D:
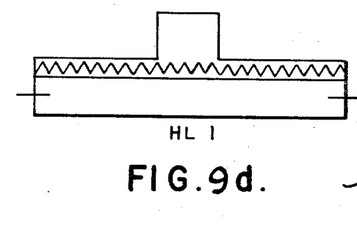

An adjustment knob is provided (E1) FIGURE 9b (E2) FIGURE 9c so that the pressure in the springs can be adjusted so that the buttons will not register empty hangers.

Although I have disclosed herein the best forms of the invention known to me at this time, I reserve the right to all such modifications and changes as may come within the scope of the following claims.

What is claimed is:

1. For use with a plurality of coded areas of storage means containing then physically present plural items, the number of items with predetermined characteristics of which are desired to be ascertained from a point remote from the storage means, an article interrogating control and read-out system comprising
   (a) interrogating means in selective electrical circuit with each area of the storage means,
   (b) selecting means in electrical circuit with said interrogating means for initially predetermining which one of said plurality of storage means areas is to be interrogated by selecting a predetermined code from a plurality of codes identifying areas of the storage means,
   (c) means for developing a signal representative of physically present items, and
   (d) read-out means selectively in circuit with an area of said storage means which is selected by said selecting and interrogating means to read out the signals indicative of them physically present items.

2. For use with a plurality of coded storage means containing then physically present plural items, the number of items of predetermined characteristics of which are desired to be ascertained from a point remote from the storage means, an article interrogating control and read-out system comprising
   (a) interrogating means in electrical circuit with each storage means,
   (b) selecting means in electrical circuit with said interrogating means for initially determining which one of said plurality of storage means is to be interrogated by selecting a predetermined code from a plurality of codes identifying different ones of the storage means,
   (c) means for developing a signal representative of physically present items, and
   (d) read-out means selectively in circuit with said one of said storage means which is selected by said interrogating and selecting means to read out the signals indicative of then physically present items ascertained from selectively and cumulatively placing all storage means in circuit with said interrogating means.

3. An article interrogating, control and read-out system for interrogating coded sections of a remote storage area to read out quantities of articles of then physically present inventory comprising, in combination
   (a) electrical detecting means adapted to develop signals indicative of the then physical presence of the articles stored in said sections, (b) means for selecting a section of the storage area to be read by selecting a code from a plurality of codes identifying the sections of the storage area, (c) means selectively in electrical connection with the selecting means for establishing electrical connection with the section selected to interrogate the electrical detecting means in association with said selected section by receiving said signals, and (d) means for visually displaying said received signals under control of the interrogating means.

4. The system of claim 3 wherein said interrogating means comprises a crossbar switch.

5. The system of claim 4 wherein said means for selecting comprises a plurality of interrogating stations.

6. The system of claim 5 wherein each of said sections is identifiable by different code and further comprising storage means at each station wherein the selected codes may be stored.

7. The system of claim 6 further comprising means at each station for determining when the crossbar switch is available for interrogating the storage area, and further means at each station for rendering operative said crossbar switch in accordance with the code stored when the crossbar switch is available.

8. For use with a plurality of storage means coded by sections containing plural items, the number of items having predetermined characteristics and being then physically present which is desired to be ascertained from a point remote from the storage means, an article interrogating control and read-out sysetm comprising (a) interrogating means in selective electrical communication with each section of said storage means, (b) selecting means in electrical circuit with said interrogating means for initially predetermining which section of said storage means is to be interrogated by selecting a code for said section from a plurality of codes identifying the sections respectively, (c) means for developing a signal representative of physically present items, and (d) read-out means in circuit with said interrogating means to read out quantities of items represented by said signals having preselected characteristics being quantities of then physically present items ascertained from selectively placing said storage means in circuit with said interrogating means.

9. An inventory interrogating control and read-out system as claimed in claim 8 wherein said storage means comprise racks on which hangers can be hung.

10. A system as claimed in claim 8, further comprising racks and sections making up said storage means and in which said interrogating means, under control of said selecting means, preliminary determines which one of a plurality of sections is to be read, and secondarily determines specifically which rack of a specific section is to be interrogated.

References Cited

UNITED STATES PATENTS

| | | | |
|---|---|---|---|
| 1,816,887 | 8/1931 | Adams | 340—147 X |
| 1,981,783 | 11/1934 | De Bussey | 340—280 |
| 2,276,943 | 3/1942 | Farmer | 340—166 X |
| 2,374,537 | 4/1945 | Goldsmith | 340—147 |
| 2,679,354 | 5/1954 | Skillman | 340—147 X |

FOREIGN PATENTS

| | | |
|---|---|---|
| 286,018 | 3/1928 | Great Britain. |
| 524,618 | 8/1940 | Great Britain. |

NEIL C. READ, *Primary Examiner.*

P. XIARHOS, D. YUSKO, *Assistant Examiners.*